July 14, 1925.

E. WILDHABER 1,545,719

METHOD OF FORMING HOBS

Filed June 8, 1922     5 Sheets-Sheet 1

INVENTOR
Ernest Wildhaber,
BY Wayne B Wells
ATTORNEY

July 14, 1925.

E. WILDHABER

METHOD OF FORMING HOBS

Filed June 8, 1922

INVENTOR
Ernest Wildhaber,
BY Wayne B Wells
ATTORNEY

July 14, 1925.

E. WILDHABER

METHOD OF FORMING HOBS

Filed June 8, 1922

INVENTOR
Ernest Wildhaber,
BY Wayne B Wells
ATTORNEY

July 14, 1925.
E. WILDHABER
METHOD OF FORMING HOBS
Filed June 8, 1922
1,545,719
5 Sheets-Sheet 4
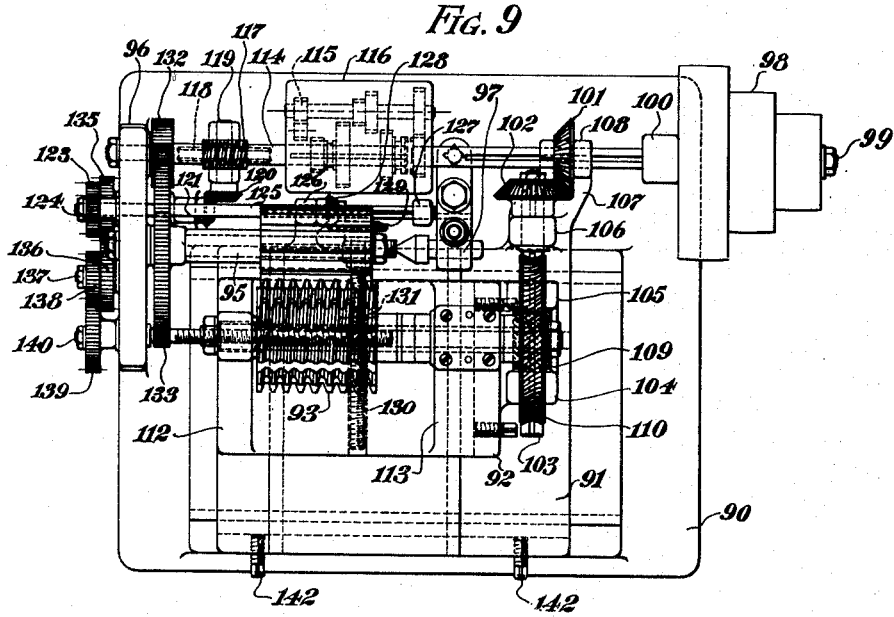
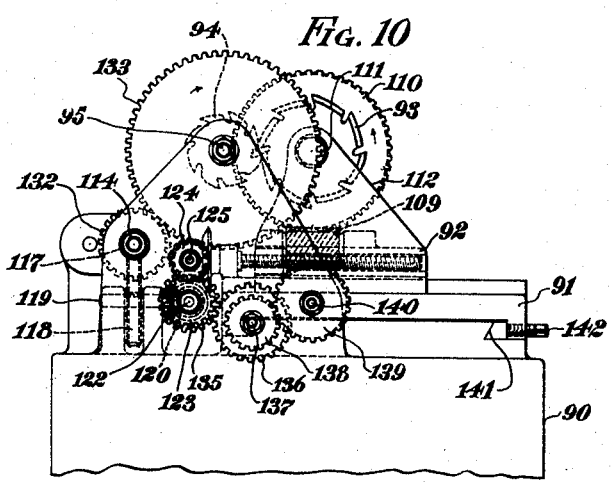
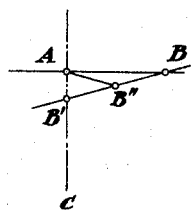
INVENTOR
Ernest Wildhaber,
BY Wayne B Wells
ATTORNEY July 14, 1925.

E. WILDHABER 1,545,719

METHOD OF FORMING HOBS

Filed June 8, 1922

INVENTOR
Ernest Wildhaber,
BY Wayne B Wells
ATTORNEY

Patented July 14, 1925.

1,545,719

UNITED STATES PATENT OFFICE.

ERNEST WILDHABER, OF BROOKLYN, NEW YORK, ASSIGNOR TO NILES-BEMENT-POND COMPANY, OF NEW YORK, N. Y., A CORPORATION OF NEW JERSEY.

METHOD OF FORMING HOBS.

Application filed June 8, 1922. Serial No. 566,855.

*To all whom it may concern:*

Be it known that I, ERNEST WILDHABER, a citizen of the Republic of Switzerland, residing at Brooklyn, in the county of Kings and State of New York, have invented certain new and useful Improvements in Methods of Forming Hobs, of which the following is a specification.

My invention relates to methods of forming rotating tools and particularly to methods of forming and relieving hobs and milling cutters.

One object of my invention is to provide a method of forming rotating tools by a continuous milling operation that shall relieve the teeth on the tool in a quick and an efficient manner.

Another object of my invention is to provide a method of forming a hob by a hobbing process that shall consist in rotating a master hob and a blank in engagement with each other and in opposite directions, and in effecting angular advancing and feeding movements between the hob and the blank for relieving the teeth being formed on the latter.

Another object of my invention is to provide a method of forming a hob that shall consist in providing a master hob having teeth formed by either axial or inclined flutes, in rotating the hob in engagement with a blank having flutes similar to the hob flutes, the blank flutes being inclined oppositely to the hob flutes if the hob flutes are inclined, the blank and the hub being rotated in opposite directions and in certain cases at the same angular speed, in effecting angular advancing movements by the hob with respect to the blank, and in effecting feeding movements of the hob with respect to the blank for relieving the teeth being formed on the latter.

Another object of my invention is to provide a method of forming a hob, that shall consist in providing a master hob having teeth formed in a right hand or a left hand thread by means of axial or inclined flutes, in rotating the hob in engagement with a blank having flutes formed in it similar to the hob flutes, the blank flutes being inclined oppositely to the hob flutes if the latter are inclined, and in forming a thread on the blank of an opposite hand to the hob thread while feeding and angularly advancing the hob with respect to the blank for relieving the teeth being formed on the blank.

A further object of my invention is to provide a method of forming a hob that shall consist in providing a hob having teeth formed therein by flutes, in rotating the hob in engagement with a blank having similar flutes formed in it, the blank and the hob being rotated in opposite directions, in feeding the hob towards or away from the blank according to the position of the hob teeth with respect to the teeth to be formed on the blank, and in angularly advancing the hob with respect to the blank, such feeding and advancing movements being effected in timed relation to each other.

At the present time, it is customary to form either a thread hob or a gear hob by means of a formed lathe tool or a milling cutter. In case a formed lathe tool is utilized for shaping the thread milling hob only one thread can be formed on the hob at a time, and consequently, the process is somewhat tedious and slow. Moreover, in such a process each tooth is separately relieved by the lathe tool. A thread milling hob may be formed by a formed milling cutter in substantially the same steps as when forming such a hob by a formed lathe tool. In case a hob is shaped by a formed lathe tool, it is preferable first to form a thread on the hob and then to cut the flutes. The teeth thus formed in the thread are relieved in the customary and usual manner by means of the formed lathe tool. It should be noted that in the method now in use only one side of each of two teeth can be relieved simultaneously. When forming a hob by means of a formed milling cutter, the flutes may be cut in the blank prior to the forming of the thread if so desired. Either ring or helicoidal thread hobs may be formed by the above method.

In forming a hob in accordance with my invention, a master hob is provided for forming a blank by a continuous operation. The blank, which is provided with flutes similar to the flutes on the master hob, is rotated in engagement with the master hob and in an opposite direction. The master hob engages the blank along the complete length and forms relieved teeth thereon in an efficient manner. It should be noted that a number of teeth are relieved on the blank simultaneously and that the operation is continuous. The master hob is similar in shape to the hob to be formed. However, the master hob is in certain cases larger in diameter than the blank in order to effect a cutting action when rotated in engagement with the blank. The blank is provided with flutes similar to the flutes on the master hob but if the flutes on the master hob are inclined, it is necessary to incline the flutes on the blank in an opposite direction. Moreover, if the master hob has a right hand thread, a left hand thread will be cut on the blank. Therefore, when cutting certain types of hobs, it is necessary to provide the master hob with a thread having an opposite hand to the hand which it is desired to form on the blank.

Although the master hob and the blank are rotated in opposite directions and at the same angular speed, a cutting action is effected by the hob, as heretofore set forth, by making the diameter of the master hob larger than the diameter of the blank. The teeth on the master hob should mesh with the teeth to be formed on the blank in the same manner as the teeth on two gear wheels mesh with each other. In certain cases, the master hob has the same number of flutes formed on it as are formed on the blank. However, in case a ring or a circular thread is formed on the blank by the hob, it is permissible to have more or less teeth on the hob as compared with the teeth formed on the blank. If a different number of flutes are formed on the blank as compared with the flutes on the master hob, it is necessary to vary the speed of a hob in accordance therewith.

Although the master hob and the blank mesh in the manner of two gear wheels, it is necessary to vary the size of the hob and the blank as compared with corresponding gear wheels in order not to obtain a pure rolling action between them. It is apparent the peripheral speed of the hob must be different from the peripheral speed of the blank in order to obtain a cutting action. Accordingly, the master hob is generally made a little larger than the pitch diameter of the corresponding gear wheel. The ratio of rotation of the hob and blank must be maintained substantially constant in order to insure the meshing or engagement of each hob tooth with the corresponding tooth being cut in the blank.

During the rotation of the hob with the blank, relative advancing movements are effected between the blank and the hob for forming a thread. Preferably, the hob is continuously and angularly advanced a slight amount in conformity to the rotation of the blank. Such action may be accomplished by so gearing the master hob to the blank that the hob rotates at a higher angular speed as compared with the blank. In order to relieve the teeth being formed on the blank, it is necessary to effect relative feeding movements between the blank and the hob. The blank and the hob are fed towards or away from each other according to the position of the teeth on the hob as compared with the teeth to be formed on the blank. If the teeth on the master hob and the blank face in opposite directions, it is necessary to feed the blank and the hob toward each other. Preferably, the hob is continuously fed towards the blank in any suitable manner and in timed relation to the blank rotation.

If the teeth on the master hob and the blank face in the same direction, it is necessary to relatively move the blank and the hob away from each other to relieve the teeth on the blank. Preferably, the hob is moved away from the blank by a continuous feeding movement and in timed relation to the blank rotation. In such latter case, it is unnecessary to relieve the teeth on the master hob with the accuracy it is necessary to relieve the teeth on a hob when the hob teeth and blank teeth face in opposite directions. However, it is necessary to have the cutting edges accurately formed. If so desired, when the blank and the hob teeth face in the same direction, the hob teeth may be roughly relieved and be provided with unrelieved ground surfaces adjacent to the cutting edges.

The blank and the hob are preferably axially moved with respect to each other in case a thread with lead is to be formed on the blank. Preferably, the master hob is fed axially with respect to the blank. In most cases the master hob is single threaded and the blank is also single threaded and in such case the lead of the master hob must be equal to the lead formed on the hob blank. If the hob blank has $n$ threads and the master hob has M threads, the lead of the master hob is $\frac{m}{n}$ times the lead of the hob blank. Accordingly, the revolutions of the master hob are substantially $\frac{n}{m}$ times the number of revolutions of the hob blank.

The master hob may relieve the teeth on the blank by radial relief or axial relief or a combination of axial and radial relief. Preferably, the teeth on the blank are relieved by the so-called radial relief. Radial relief is preferred to axial relief or a combination of axial and radial relief inasmuch as the teeth may be relieved in one operation. In case the teeth are relieved by axial relief, it is necessary to relieve one side of the teeth by one operation and to relieve the opposite side of the teeth of the blank by another operation.

If so desired, the flutes on the hob and the blank may form undercut teeth. Moreover, the axis of the hob may be elevated with respect to the axis of the blank, if so desired. The elevation of the master hob will cut involute helicoidal surfaces on the teeth of the blank. In case the hob blank is provided with involute helicoidal surfaces, such surfaces can be ground with ease and accuracy.

Figure 4:
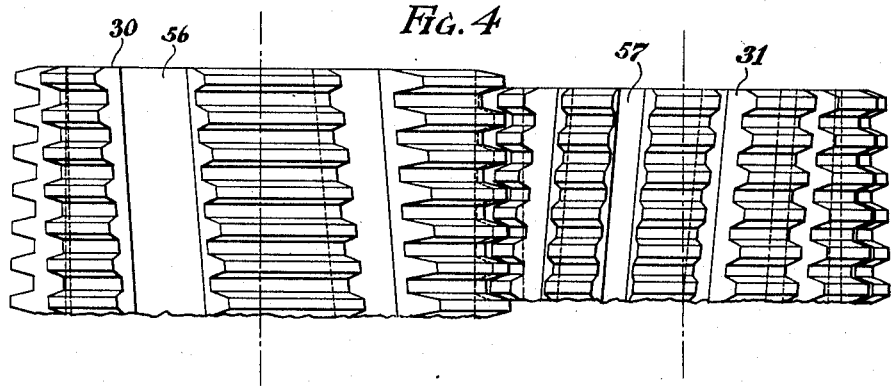
Fig. 4 is a diagrammatic plan view of a master hob and a blank having inclined flutes.
Figure 5:
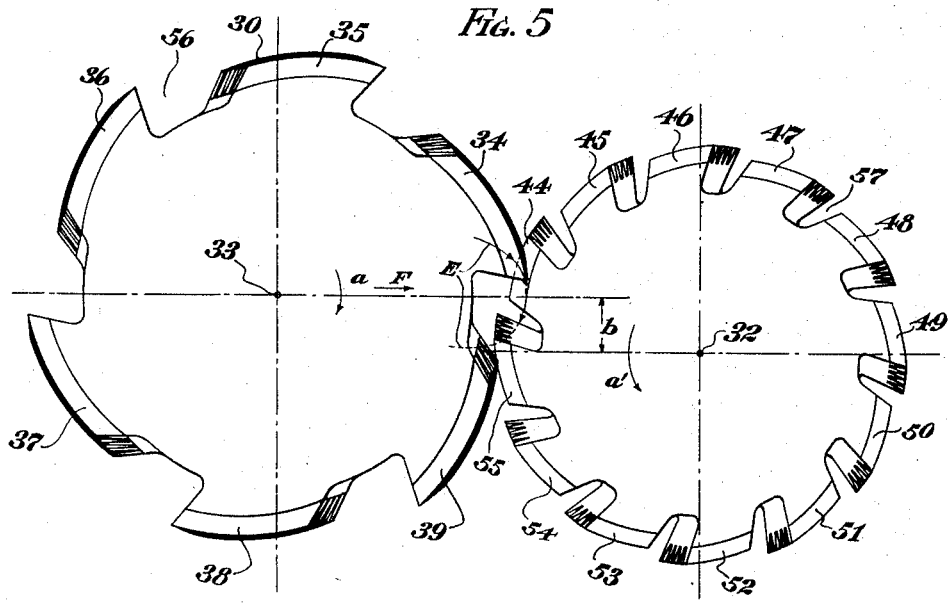

Fig. 5, which is an end view of the hob and blank illustrated in Fig. 4, shows the axes of the hob and blank in different planes.

Figure 6:
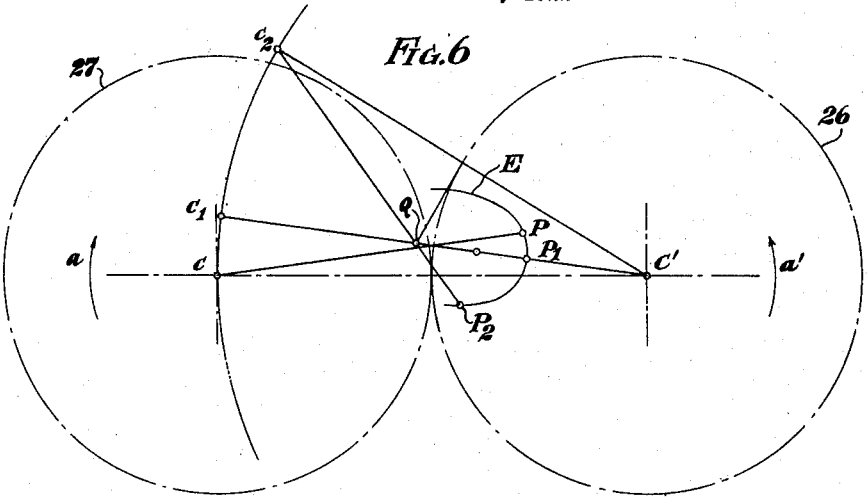

Fig. 6 is a diagrammatic view showing the relative movement of a cutting point.

Figure 7:
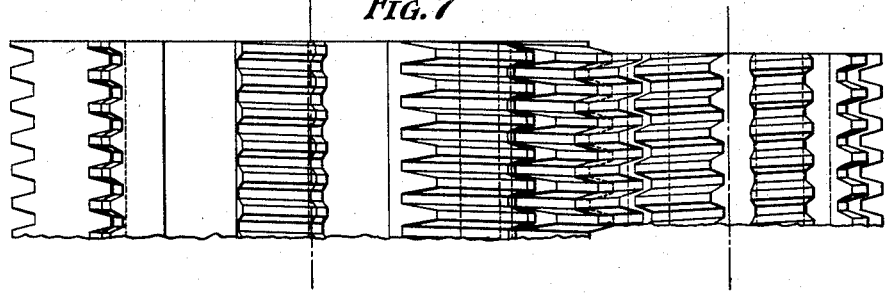

Fig. 7 is a diagrammatic plan view illustrating the cutting of a thread with lead on a hob blank.

Figure 8:
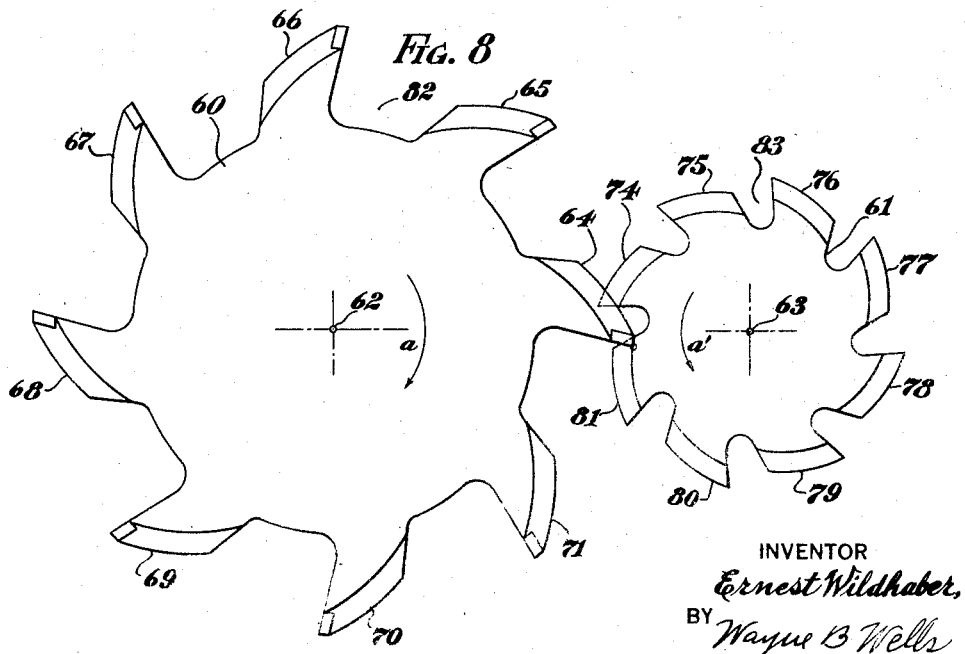

Fig. 8, which is an end view of the hob and blank shown in Fig. 7, shows the teeth of the hob and blank facing in the same direction.

Fig. 9 is a diagrammatic view of a machine for shaping a blank in accordance with my invention.

Fig. 10 is an end view of the machine shown in Fig. 9.

Fig. 11 is a diagrammatic view illustrating the relation between side relieving and radial relieving movements.

Figure 12:
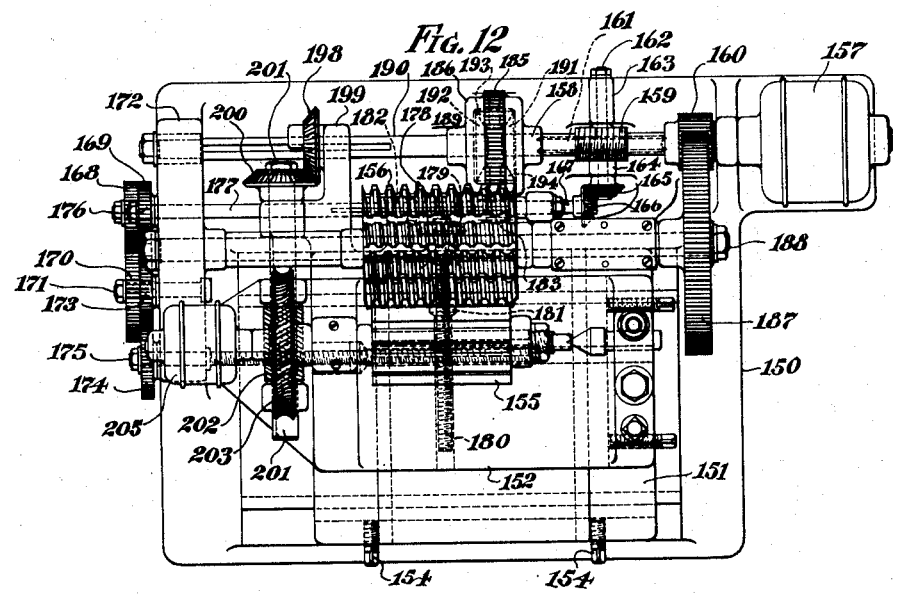

Fig. 12 is a diagrammatic plan view of a machine having a differential gear mechanism for controlling the feeding movement.

Figure 13:
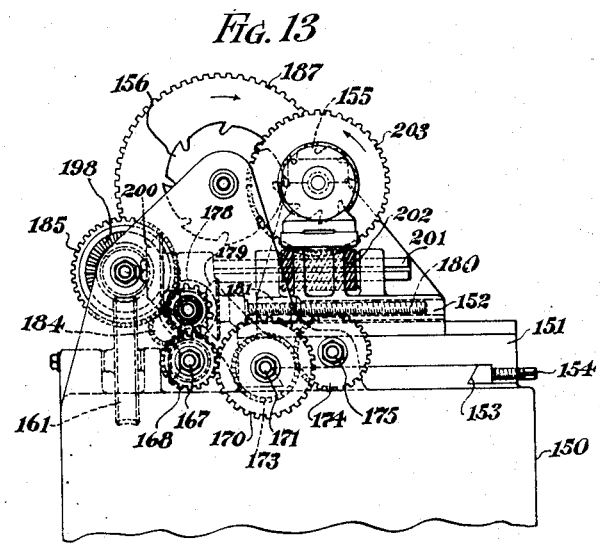

Fig. 13 is an end view of the machine shown in Fig. 12.

Figure 1:
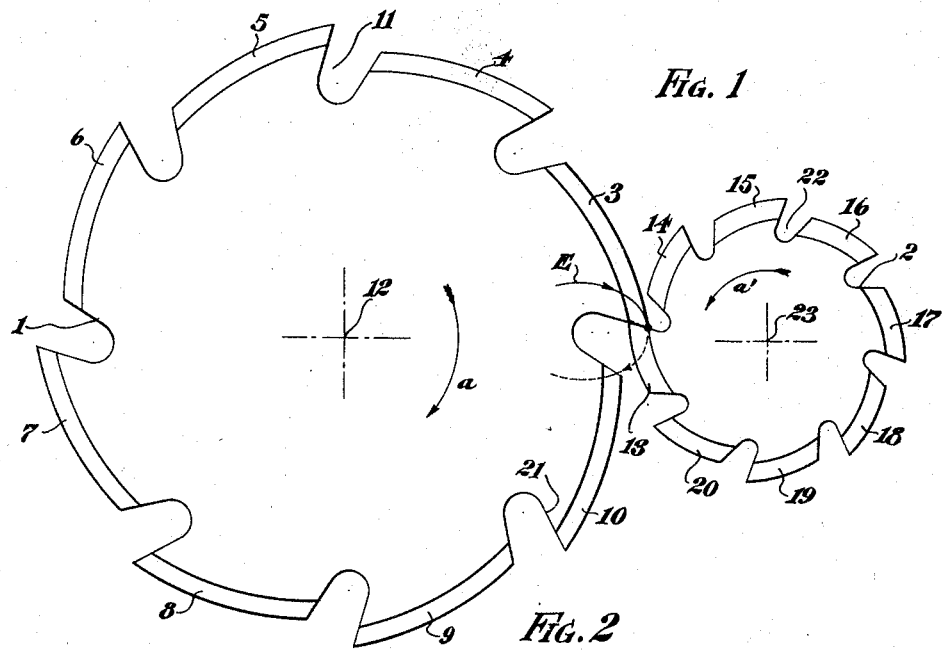
Figure 1 is a diagrammatic view of a blank being shaped by a master hob in accordance with my invention.

Referring to Fig. 1 of the drawings, a hob 1 is shown in engagement with a blank 2. The hob 1 comprises teeth 3 to 10, inclusive, which are formed by means of axial flutes 11. The hob is assumed to rotate on an axis 12 in a clockwise direction as indicated by the arrow $a$. The cutting faces 21 of the teeth 3 to 10, inclusive, are assumed to face in the direction of rotation of the hob.

The blank 2 comprises teeth 13 to 20, inclusive, which are formed by means of flutes 22. Completed blank teeth have been shown in Fig. 1 of the drawings for more clearly illustrating my invention. The flutes 22 are assumed to be axial and the teeth 13 to 20, inclusive, are assumed to respectively engage the teeth 3 to 10, inclusive, of the master hob. The blank is assumed to rotate on an axis 23 in a counter clockwise direction as indicated by the arrow $a'$. The flutes 22 on the blank and also the relief which is formed on the tops of the teeth 13 to 20, inclusive, may be effected by means of a formed milling cutter, if so desired. By so relieving the tops of the blank teeth approximately to size, it is possible to shape and relieve teeth on the blank very quickly by the master hob. However, it is to be understood that, if so desired, the flutes 22 in the blank may be first cut and then the teeth may be completely shaped and relieved by means of a master hob.

The master hob 1 and the blank 2 are rotated at the same angular speed in order to obtain engagement between the teeth 3 to 10, inclusive, on the hob with the teeth 13 to 20, inclusive, being formed on the blank. Inasmuch as the hob 1 is larger in diameter than the blank 2, a cutting action takes place between them. It will be noted that the hob and the blank engage each other somewhat in the manner of two meshing gear wheels. However, the diameter of the hob must be made somewhat larger than the pitch diameter of a corresponding gear wheel in order to prevent true rolling action between the hob and the blank. Inasmuch as the hob and blank rotate at substantially the same speed, it is necessary to angularly advance the hob in order to effect a cut along the complete length of each tooth. At the same time as the angular advancing movement is effected by the hob, the hob is fed towards the blank in order to produce relief on the blank teeth. The angular advancing movement and also the feeding movement should be effected in timed relation to the rotation of the blank and the hob. Such movements may be effected either by the hob or by the blank. The hob and the blank must rotate in timed relation to each other in order to effect correct engagement between the teeth of the hob and the teeth of the blank.

Although the hob and the blank rotate at the same angular speed, it is apparent the peripheral speed of the teeth on the hob is greater than the peripheral speed of the teeth being formed on the blank, accordingly as heretofore set forth, a cutting action takes place on the blank. The path of movement of a cutting point on the hob is indicated by the arrow E in Fig. 1 of the drawings. The teeth on the blank face in an opposite direction as compared with the teeth on the hob and for this reason, the hob is fed towards the blank in order to relieve the blank teeth. If the blank teeth faced in an opposite direction, it would be necessary to feed the hob and the blank away from each other as will be explained in connection with Fig. 8 of the drawings.

Figure 3:
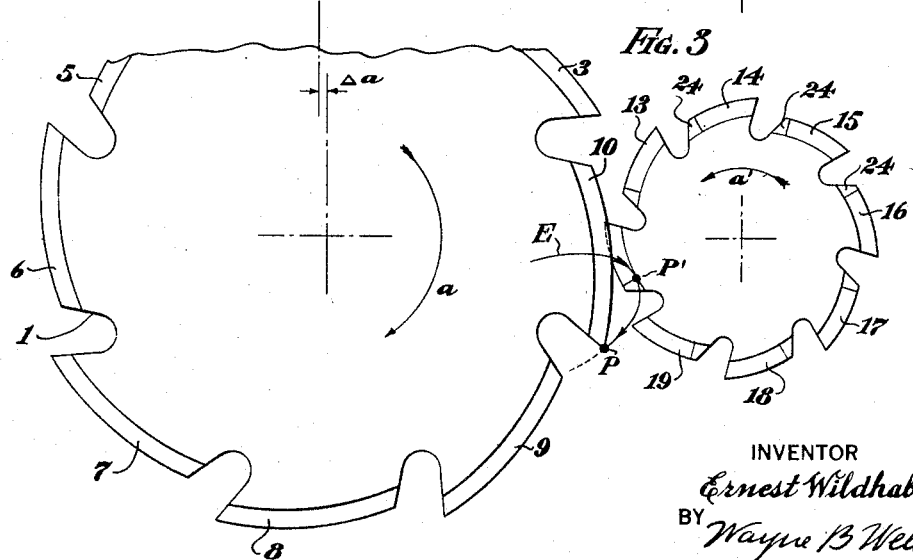
Fig. 3 is an end view similar to Fig. 1 and showing the blank teeth nearly completed.

Referring to Fig. 3 of the drawings, it will be noted the hob 1 has been fed forward a distance Δ<sup>a</sup> to relieve the teeth on the blank. The teeth 13 to 20, inclusive, on the blank shown in Fig. 3, have been completely shaped and relieved with the exception of a small shaded portion 24 shown at the end of each tooth. Such shaded portion will be cut away when the hob is angularly advanced a small amount. The arrow E indicates the path of movement of a cutting point on the hob and it will be noted that such path of movement is so curved as to prevent any interference between the hob teeth and the blank teeth adjacent to the tooth being cut. Thus, each hob tooth cuts one blank tooth and in no way interferes with the adjoining blank teeth. The path of movement of a cutting point on the hob will be further discussed when reference is made to Fig. 6 of the drawings. However, it should be noted that the relative path of movement of a cutting point on the hob is very sharply curved. Consequently, the teeth of the hob may be made large and strong. Such large hobs, operated in accordance with my invention, clear the adjoining teeth on a blank much better than a milling cutter of a much smaller size when operated according to the usual practice. Moreover, attention is called to the fact that no reciprocating movement is necessary in order to relieve the teeth being formed on the blank. One continuous feeding movement in one direction only is all that is required for relieving and forming the teeth on the blank. Thus, the ordinary cam, which is provided for relieving the teeth on a hob blank, is eliminated as well as the various movements controlled thereby.

Figure 2:
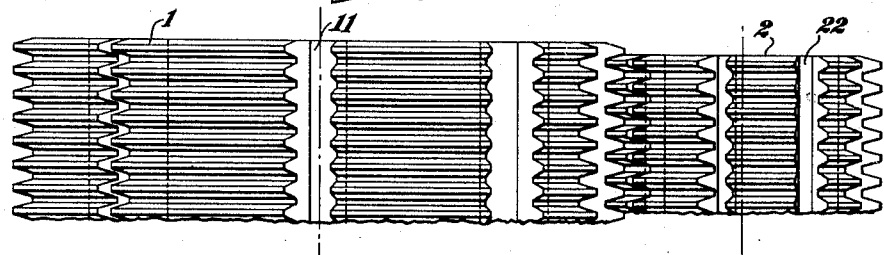
Fig. 2 is a plan view of the hob and blank shown in Fig. 1.

Although a ring hob having axial flutes is illustrated in Figs. 1, 2 and 3 of the drawings, it is to be understood that the hob flutes may be inclined in either direction if so desired. However, if the hob flutes are inclined, it is necessary to provide similar flutes in the blank which are inclined in an opposite direction. If the thread on the master hob is provided with a lead, a similar thread will be formed on the blank with the lead in an opposite direction. The master hob may have single, double or any number of threads formed on it. The various threads may be formed on the blank in accordance with the relative rotation of the hob and the blank and in accordance with the number of threads on the hob. The forming of helical threads will be more specifically described when reference is made to Figs. 7 and 8 of the drawings. Attention is also called to the fact that the relative speed between the hob and the blank may be so varied that each tooth on the hob cuts more than one tooth on the blank. Moreover, the master hob may be provided with interrupted or staggered teeth which will cut similar staggered or interrupted teeth on the blank. Although threaded hobs have been shown in the drawings, it is to be understood that other hobs and particularly gear hobs may be made in a similar manner.

Referring to Fig. 6 of the drawings, the relative movement of a cutting point on a master hob with respect to a blank will be considered. A blank 26 shown in Fig. 6 is assumed to have the same number of grooves as a master hob 27 and to be rotated at the same angular speed. The hob and the blank for simplicity are indicated by their pitch circles. The master hob is assumed to rotate on an axis C and the blank is assumed to rotate on an axis C'. Although in practice, the blank and the hob would rotate in opposite directions, as indicated by the arrows $a$ and $a'$ in Figs. 1 and 6 of the drawings, it is assumed that the blank 26 remains stationary while the hob not only rotates on its axis C but also revolves around the blank 26. It is apparent that such movement of the master hob is equivalent to the rotation of the hob and the blank on their respective axes. Such assumption is made merely for convenience in determining the path of movement of a cutting point on the master hob.

The point P is assumed to be a cutting point on the master hob and it is desired to trace the path of movement of such point when in engagement with the blank 26. The point P is closest to the center C' of the blank 26 when in position $P_1$ and on a line passing through the axes C and C'. In order to move the point P to such position, the line PC must be turned through an angle PCC'. In other words, the master hob must be rolled or revolved through the angle PCC'. The axis C of the master hob 27 assumes a position indicated by the character $C_1$. In such position of the hob and the blank, the angle $C_1C'C$ must equal the angle PCC'. It is apparent that the point $P_1$ is closest to the center of the blank for the line CC' passes through the centers of the hob and the blank.

The axis C of the hob 27 may be assumed to be revolved to any new position $C_2$. The position $P_2$ of the point P corresponding to the new position of the hob with respect to the blank is determined by making the angle $P_2C_2C'$ equal to the rolling angle $C_1C'C_2$ of the hob and by plotting the distance CP on the line $C_2Q$. The line tangent to the pitch circle of the blank 26 at the intersection point of the line $C_2C'$ with the pitch circle of the blank intersects the line $C_1C'$ at the point Q. The line $C_2P_2$ necessarily passes through the point Q and the angle $P_2C_2C'$ is equal to the angle $C_1C'C_2$. Any other position of the point P may be determined in like manner and the complete curve E may be plotted, as indicated in Fig. 6 of the drawings. In the above example, it is assumed that the master hob and the blank have the same number of flutes and the ratio of rotation of the hob and the blank is substantially one to one. If the number of flutes on the blank is varied as compared to the number of flutes on the hob and the speed ratio between the hob and blank is varied, the above method of plotting the path of movement of a point P must be varied in accordance therewith.

In examining the curve E as indicated in Fig. 6 of the drawings, it is apparent the cutting point engages and disengages the blank very rapidly and along a very sharp curve. Consequently, it is possible to make the master hob comparatively larger in diameter as compared to the blank and in no way to obtain interference between the hob teeth and the blank teeth other than the tooth which is being cut.

Referring to Figs. 4 and 5, a master hob 30 is shown in engagement with a blank 31. The blank 31 is assumed to rotate on an axis 32 in a counter-clockwise direction as indicated by the arrow $a'$. The hob 30 rotates on an axis 33 which is located a distance $b$ above the axis 32 of the blank 31. The hob is provided with six teeth 34 to 39, inclusive, whereas the blank is provided with twelve teeth 44 to 55, inclusive. The hob 30 is provided with spiral flutes 56 and the blank 31 is provided with spiral flutes 57. It will be noted, as shown in Fig. 4 of the drawings, that the spiral flutes 56 and 57 extend in opposite directions. The hob 30 rotates in a clockwise direction as indicated by the arrow $a$.

Inasmuch as the hob 30 is provided with half as many teeth as the blank 31, it is necessary to vary the speed ratio between the hob and the blank in accordance with such difference in the number of teeth on them. The tooth 34 on the hob 30 not only cuts and shapes the tooth 44 on the blank but also cuts and shapes the tooth 50 on the blank. The tooth 35 on the hob cuts and shapes the teeth 45 and 51 on the blank. In like manner each of the remaining teeth on the hob cut and shape two teeth on the blank. Although spiral flutes have been shown with the hob having a less number of teeth than the number of teeth on the blank and with the hob having the axis thereof elevated above the axis of the blank, it is to be understood that spiral flutes may be provided on any suitable hob and blank. It should also be noted that although thread hobs have been adapted for illustrative purposes, it is to be understood that my invention is in no way limited to such type of hobs and that the various features described are equally adapted to other hobs such for example, as gear cutting hobs.

In the arrangement shown in Fig. 5 of the drawings, the teeth on the blank and the teeth on the hob extend in opposite directions and, accordingly, it is necessary to feed the blank and hob towards each other in order to relieve the teeth on the blank. Although the arrow F indicates the hob is moved towards the blank, it is to be understood that the blank may be fed towards the hob if so desired.

In moving the hob in a plane other than a plane directed towards the axis of the blank, it is possible to provide a blank with involute relieved curves. The above statement is true not only for circular or ring hobs but also for helicoidal hobs. It is necessary, however, to make a different setting for each of the types of hobs. It may also be noted that in order to cut true involute helicoidal relieved surfaces on helicoidal hobs, it is necessary to make a different setting for each side of the teeth. The two sides of the teeth therefore can only be cut one after the other. It will be noted that involute helicoidal surfaces can be ground with ease and accuracy and it is possible to figure out various corrections as for example, against spiral flutes or undercut teeth if involute relieved surfaces are provided.

Preferably, the master hob and the blank are provided with undercut teeth in order to improve the cutting action and moreover, it is preferable to have the teeth of the master hob ground. When the hob and the blank are provided with undercut teeth, it is found desirable to slightly correct the cutting angles of the master hob in order to obtain exact cutting angles on the blank. The corrections which are made to the hob teeth depend upon the amount of relief, the amount of undercut and the lead of the flutes, such corrections may be determined by experiment, if so desired, or may be figured mathematically. Moreover, it should be noted that the corrections are different for the two sides of the hob where helicoidal hobs are used. The mathematical determinations of the corrections necessary to be made to the master hob are very long and it is believed unnecessary to discuss and explain the same. Such corrections may be determined experimentally with little trouble.

In Figs. 7 and 8 of the drawings, a hob 60 is shown operating in engagement with a blank 61. The hob 60 rotates in a clockwise direction on an axis 62, as indicated by the arrow $a$. The blank 61 rotates on an axis 63 in a counter-clockwise direction, as indicated by the arrow $a'$. The hob 60 is provided with eight teeth 64 to 71, inclusive, which engage eight teeth 74 to 81, inclusive, on the blank. It will be noted that the blank teeth face in exactly the same direction as the teeth on the hob. In the hob and blank shown in Figs. 1, 2 and 3 of the drawings, the hob and blank teeth face in opposite directions. The hob 60 is provided with axial or straight flutes 82 and the blank 61 is provided with similar flutes 83.

The teeth on the master hob are arranged in the form of a left hand thread, as indicated in Fig. 7 of the drawings. The teeth being formed on the blank are arranged in the form of a right hand thread. Inasmuch as the thread on the blank extends in an opposite direction to the thread on the hob, it is necessary to provide the master hob with a thread in an opposite hand to that which it is desired to form on the blank. Although, the thread with lead is illustrated with the hob 60 having straight flutes, it is to be understood that a hob and blank may operate in exactly the same manner and be provided with spiral flutes or inclined flutes extending through the helicoidal thread.

When the cutting faces of the hob and blank face in the same direction, it is much preferable to begin the relieving of the blank teeth at the inner end of each tooth. The starting of a relieving operation is indicated in Fig. 8 of the drawings. In order to relieve the teeth on the blank, it is necessary to move the hob and the blank away from each other in timed relation to their rotation. By so relieving the blank when the faces of the teeth on the blank and the hob face in the same direction, it is possible to operate the master hob without forming any exact relief thereon. The teeth of the hob may be provided with ribbons 85 of unrelieved surfaces. Such ribbons may be formed on the hob by contour grinding and preferably such ground surfaces conform to an involute helicoidal thread. By so forming the ground surfaces, it is possible to grind such surfaces with little trouble. It is preferable, however, to cut the teeth of the hob back of the front cutting face in order to prevent interference between the hob teeth and teeth on the blank other than the tooth which is being operated upon. Such cutting away of the hob back of the cutting face does not need to conform to any predetermined relief. The relief on the blank teeth is formed by the movement of the hob and the blank away from each other. The hob is movable away from the blank in timed relation to the blank and hob rotation.

In forming a helicoidal hob in accordance with my invention, the two relieved side surfaces of each tooth are cut with the same master hob and simultaneously. It is not only necessary to provide radial feeding movement for relieving the teeth being formed on the blank but it is also necessary to provide an axial or lead movement in accordance with the lead of the hob thread. If the axial movement does not correspond to the lead of the continuous hob thread, the two sides of the teeth will not be equally relieved. One side of each tooth will be more relieved as compared with the continuous thread.

As shown in Fig. 7 of the drawings, it is always necessary to provide a master hob with a thread of the opposite hand to the thread which is to be cut on the blank. In the majority of cases, the master hob is made single threaded, as shown in Fig. 7 of the drawings. If the blank is also single threaded the lead of the master hob must be made equal to the lead of the hob blank. Generally, if the blank has $n$ threads and the master hob has $m$ threads, the lead of the master hob will be $\frac{m}{n}$ times the lead of the blank. The number of revolutions of the master hob is substantially $\frac{n}{m}$ times the number of revolutions of the blank.

When the blank teeth are radially relieved by the master hob, it is necessary to move the hob and the blank towards or away from each other and at the same time to angularly advance the hob with respect to the blank. Moreover in case the hob and the blank threads have a lead, it is necessary to axially move the hob or the blank in accordance with the lead.

In place of radially relieving the blank teeth, axial relief or a combination of radial and axial relief may be provided, if so desired. Referring to Fig. 11 of the drawings, a radial relieving movement of the hob with respect to the blank is indicated by the line AB. In other words, the hob is advanced or withdrawn with respect to the blank along the line AB for a distance corresponding to the length of the line AB. In like manner an axial relieving movement will correspond to the line AB'. A combined relieving movement would be in a direction corresponding to the line AB''. Very nearly the same effect would be accomplished by utilizing any one of the three different kinds of relieving movements.

In case the blank is relieved by an axial relieving movement, the master hob is advanced axially corresponding to the lead of the master hob plus or minus the lead due to the relief depending on the side which is being cut. The two sides of each tooth are therefore cut one after the other. However, it is possible to simultaneously cut one blank by means of two hobs. When providing side relief or axial relief, the relieved surfaces thus obtained are parts of helicoidal surfaces. If the cutting edges of the master hob are parts of the involute helicoidal surfaces, then a blank will be formed in accordance with involute helicoidal surfaces. Radial relief is usually preferred to axial relief because the two sides of the teeth can be relieved simultaneously.

Referring to Figs. 9 and 10 of the drawings, a machine is diagrammatically shown for shaping a blank in accordance with my invention. The machine comprises a main frame 90 having a longitudinally movable slide 91 mounted thereon. The slide 91 carries a laterally movable slide 92. The slide 92 supports a master hob 93 in any suitable manner. The master hob is rotated in a counter-clockwise direction, as indicated by the arrow $a''$ in Fig. 10 of the drawings. The master hob engages a blank 94 which is suitably mounted on a spindle 95. The spindle 95 is supported by brackets 96 and 97 which project from the main frame 90 of the machine.

The machine is operated by pulleys 98 which are connected to any suitable source of power. The pulleys 98 are fixedly mounted on a shaft 99 which is provided with bearings in the bracket 97 and a bracket 100. A bevel gear wheel 101, which is keyed to and slidably mounted on the shaft 99, serves to rotate the master hob 93 in a counter-clockwise direction. A bevel gear wheel 102, which meshes wth the gear wheel 101, is fixedly mounted on a shaft 103. The shaft 103 is supported by arms 104, 105 projecting from the slide 92 and an arm 106 projecting from the slide 91. An arm 107, which projects from the slide 91, is provided with a yoke-shaped end portion 108. The end portion 108 engages the bevel gear wheel 101 in order to cause such gear wheel to follow the movements of the slide 91. Thus, the gear wheels 101 and 102 are always maintained in mesh with each other regardless of the position of the slide 91. The bevel gear wheel 102 is restrained against longitudinal movement on the shaft 103 by means of the bracket 106 and a bolt which is secured to the end of the shaft 103. A worm member 109 is keyed to but slidably mounted on the shaft 103. The worm member 109 is located between the arms 104, 105 on the slide 92 in order to follow the movements of the slide. A worm wheel 110, which is mounted on a shaft 111 connected to the hob spindle, meshes with the worm member 109. The shaft and spindle are provided with suitable bearings in the brackets 112 and 113 which project from the slide 92.

The shaft 99, which carries the pulley 98, is connected to the shaft 114 through a set of change gears 115 which are enclosed within the change gear box 116. The change gears 115 may be of any suitable type and are here shown as providing for three different speeds in a forward direction and one reverse speed. A detailed description of such change gears is deemed unnecessary. The shaft 114 is provided with bearings in the bracket 96 and in the change gear box 116. A worm member 117, which is fixedly mounted on the shaft 114, meshes with a worm wheel 118 which is mounted on a short shaft 119. The worm wheel 118 is mounted on the shaft 119 between two arms which project from the main frame of the machine. The shaft 119 carries a bevel gear wheel 120 which meshes with a bevel gear wheel 121 on a shaft 122. The shaft 122 carries a gear wheel 123 which meshes with a gear wheel 124 on a shaft 125. The shaft 125 is provided with the bearings in the bracket 96 and in brackets 126 and 127 which project from the main frame of the machine. A bevel gear wheel 128 is keyed to but slidably mounted on the shaft 125 between the two brackets 126 and 127. The bevel gear wheel 128 meshes with a bevel gear wheel 129 which is fixedly mounted on a feed screw 130. The feed screw 130 is provided with suitable bearings on the slide 92 and is connected to the slide 92 by means of the suitable nut 131. Such feed screw serves to feed the master hob towards the blank in order to relieve the teeth being cut on the blank. An arm, which projects from the slide 92, engages the bevel gear wheel 128 and causes it to follow the movements of the slide and to maintain the gear wheels 128 and 129 in mesh with each other.

A gear wheel 132, which is mounted on the shaft 114 adjacent to the bracket 96, meshes with a gear wheel 133 which is mounted on the blank spindle 95. Such connection serves to effect rotation of the blank 94 in timed relation to the rotation of the master hob 93.

A gear wheel 135, which is mounted on the shaft 122 between the bracket 96 and the gear wheel 123, meshes with a gear wheel 136 on a short shaft 137. The shaft 137 is supported in the bracket 96 and carries a second gear wheel 138 which meshes with a gear wheel 139 on a feed screw 140. The feed screw 140 serves to effect longitudinal movement of the slide 91 in any suitable manner. It will be noted the slide 91 operates on a guide 141 and set screws 142 are provided for locking the slide 91 in any set position. In case a thread without lead is being cut on the blank, it is necessary to lock the slide 91 against any longitudinal movement.

The gear connections between the master hob and the source of power and between the blank and the source of power are so adjusted as to effect advancing movement by the master hob. Thus, the speed of rotation of the master hob is slightly greater than the speed of rotation of the blank in order to effect a continued cutting action by the hob along the blank teeth. Inasmuch as the hob and the blank are geared directly to the same source of power, it is apparent such members are rotated in timed relation to each other. Moreover, the gearing for effecting feeding movement of the hob towards the blank is connected to the same source of power and consequently the feeding movements are effected in timed relation to the rotation of either the hob or the blank.

In the machine illustrated in Figs. 9 and 10 of the drawings, the hob and the blank spindles are directly geared with each other at an uneven ratio which corresponds substantially to the ratio of the number of flutes on the hob and the blank. In such a machine it is necessary to change the gear wheels connecting the two spindles if a change in the feed is desired. In the machine illustrated in Figs. 12 and 13 of the drawings, a differential gear mechanism is provided between the blank and the hob spindles in order to obviate the necessity of changing the gear connection between such spindles when a change in the feed is desired.

Referring to Figs. 12 and 13 of the drawings, a machine is disclosed comprising a main frame 150, a longitudinally movable slide 151 and a transversely movable slide 152 which is mounted on the slide 151. The slide 151 operates on a guide 153 on the main frame 150 and is adapted to be locked in any set position by means of set screws 154. The slide 152 carries a blank 155 which is to be operated on by a master hob 156. The master hob 156 is mounted directly on the main frame of the machine.

The machine is operated by any suitable source of power, such for example, as a motor 157 which is mounted on the main frame. The armature shaft of the motor is directly connected to a shaft 158 which carries a worm 159 and a pinion 160. The worm 159 meshes with a worm wheel 161 which is mounted on the shaft 162. The shaft 162, which is provided with bearings 163 and 164 on the main frame of the machine, carries a beveled gear wheel 165 near the end thereof. The gear wheel 165 meshes with a bevel gear wheel 166 on a shaft 167. The shaft 167 extends across the machine and carries gear wheels 168 and 169 near the end thereof. The gear wheel 168 meshes with a gear wheel 170 which is mounted on a short shaft 171. The shaft 171 is mounted on a bracket 172 which projects from the main frame 150 of the machine. The shaft 171 carries a second gear wheel 173 which meshes with a gear wheel 174 on a feed screw 175. The feed screw 175 engages the slide 151 by any suitable nut and serves to effect longitudinal movement of such slide. Such longitudinal movement of the slide is necessary whenever the blank and the hob being operated on are provided with lead.

The gear wheel 169 meshes with a gear wheel 176 which is mounted on a shaft 177. The shaft 177 is provided with suitable bearings on the main frame 150 of the machine and carries a bevel gear wheel 178.

The bevel gear wheel 178 is keyed to a slide mounted on the shaft 177 and meshes with a bevel gear wheel 179 on a feed screw 180. The feed screw 180 engages a nut 181 on the slide 152 and serves to effect relative feeding movement between the blank and the hob. In the machine disclosed in Figs. 12 and 13 of the drawings, it will be noted the blank is fed towards the hob whereas in a machine disclosed in Figs. 9 and 10 of the drawings, the hob is fed towards the blank. A bracket 182, which projects from the slide 151, engages the bevel gear wheel 178 in order to effect movement of such gear wheel in accordance with the movement of the slide 151.

The shaft 177 also carries a gear wheel 183 which meshes with a gear wheel 184 which is mounted on a shaft projecting from the frame of the machine. The gear wheel 184 meshes with teeth 185 which are formed on the periphery of a differential gear box 186. The function of such gear wheel and the differential gear mechanism will be described hereinafter.

The pinion 160, which is mounted on the shaft 158, meshes with a gear wheel 187 which is mounted on the shaft 188. The shaft 188 is connected to a spindle which supports the hob 156.

The shaft 158 is directly connected to one end of a differential gear mechanism 189 and a shaft 190 is connected to the opposite end of the differential gear mechanism. The differential gear mechanism is of the usual and common construction and comprises two bevel gear wheels 191 and 192 which are respectively mounted on the shafts 158 and 190. The gear wheels 191 and 192 mesh with pinions 193 and 194 which are suitably supported in the casing 186. In such construction it is apparent if the casing 186 is held stationary, the shaft 190 will be rotated in accordance with the rotation of the shaft 158. Moreover, if any movement of the casing 186 is effected, corresponding variations will be effected between the rotation of the shaft 158 and the shaft 190. The differential gear mechanism 189 serves to vary the relative rotation between the hob and the blank in accordance with the feeding movement effected between such members. The operation of such differential gear mechanism to perform such functions will be described more fully hereinafter.

A bevel gear wheel 198 is slidably mounted on and keyed to the shaft 190. An arm 199, which projects from the slide 151, engages the bevel gear wheel 198 in order to effect movement of such gear wheel in accordance with the movement of the slide. The gear wheel 198 meshes with a bevel gear wheel 200 which is mounted on a shaft 201. The shaft 201 is suitably mounted on the slide 151 and carries a worm member 202. The worm member 202 meshes with a worm wheel 203 which is mounted on or connected to the spindle which supports the blank 155. By such means the blank 155 is operated in a counter-clockwise direction, as indicated in Fig. 13 of the drawings. The hob 156 is rotated in a clockwise direction, as indicated by the arrow in Fig. 13 of the drawings. An auxiliary motor 205, which is connected to the blank spindle produces a torque opposing the action of the worm 202 in order to maintain the worm 202 and the worm wheel 203 always in correct engagement with each other. The master hob 156 engaging the blank 155 tends at certain periods to rotate the blank 155 and take the load off of the worm 202 and the worm wheel 203. However, the torque motor 205 opposes such action and maintains a load at all times on the worm member 202.

In the machine above described, it will be noted the hob 156 is directly connected to the motor 157 whereas the blank 155 is connected to such motor through the differential gear mechanism 159. Moreover, it will be noted the differential gear mechanism varies the rotative movement of the shaft 190 as compared with the shaft 158 in accordance with the operation of the shaft 167 and the shaft 177. Such shafts, as has already been set forth, control the operation of the feed screw 180 and accordingly the relative feeding movement between the blank and the hob. Consequently, the differential gear mechanism 189 is varied in accordance with the feeding movements between the blank and the hob. Accordingly, the rotation of the blank, as compared with the rotation of the hob, is varied in accordance with the feeding movements between such members. Thus, it is unnecessary to vary the gearing connection between the hub and the blank when the feeding movements are varied.

It will be understood that such changes and modifications may be made in my invention as fall within the limits of the appended claims.

What I claim is:

1. A method of forming hobs, which consists in rotating a blank, in providing a formed tool for engaging the blank, in effecting continuous relative movement between the tool and the blank for shaping the teeth on the latter, and in effecting continuous feeding movement in one direction between the tool and the blank for relieving the teeth being formed on the blank.

2. A method of forming hobs, which consists in rotating a blank having flutes cut therein, in providing a formed tool adapted to simultaneously cut teeth along the complete length of the blank, and in so moving the tool in one direction with respect to the blank as to relieve all the blank teeth in one operation.

3. A method of forming hobs, which consists in rotating a blank having flutes cut therein, in providing a cutting tool adapted to cut simultaneously the teeth along the complete length of the blank, in effecting relative angular movement between the tool and the blank, and in effecting additional movement of the tool continuously in one direction for relieving the teeth formed on the blank.

4. A method of forming hobs, which consists in rotating a blank having flutes cut therein, in rotating a tool in engagement with the blank, and in effecting feeding movements between the tool and the blank in one direction only for relieving the teeth being formed on the blank.

5. A method of forming hobs, which consists in rotating a blank having flutes cut therein, in rotating a tool in engagement with the blank and in timed relation thereto for forming teeth, and in effecting continuous feeding movement between the tool and the blank in one direction for relieving the teeth being formed on the blank.

6. A method of forming hobs, which consists in rotating a blank having flutes cut therein, in rotating a tool in engagement with the blank, said tool being rotated in timed relation to the blank rotation, and in effecting feeding and angular advancing movement between the tool and the blank for forming relieved teeth on the blank.

7. A method of forming hobs, which consists in rotating a blank having flutes cut therein, in rotating a tool in engagement with the blank, said tool being rotated in timed relation to the blank rotation, and in effecting angular advancing movement between the tool and the blank while feeding the tool in one direction only for forming relieved teeth on the blank.

8. A method of forming hobs, which consists in providing a master hob, in rotating the hob and a blank in engagement with each other, in effecting relative angular advancing movement between the hob and the blank, and in effecting relative feeding movement between the hob and the blank to relieve the teeth being formed on the latter.

9. A method of forming hobs, which consists in providing a master hob, in rotating the hob and a blank in engagement with each other, the hob and the blank being rotated in opposite directions, and in relatively moving the hob and the blank to relieve the teeth being cut on the latter.

10. A method of forming hobs, which consists in providing a master hob, in rotating the hob and a blank in opposite directions and in timed relation to each other for forming teeth, and in effecting relative feeding movement between the hob and the blank to relieve the teeth being cut on the latter.

11. A method of forming hobs, which consists in providing a master hob, in rotating the hob and a blank on parallel axes and in timed relation to each other for forming teeth on the blank, and in effecting relative feeding movement between the hob and the blank to shape and relieve the teeth being formed on the latter.

12. A method of forming hobs, which consists in providing a master hob, in rotating the hob and a blank in opposite directions and in timed relation to each other, the speed ratio of the hob and the blank corresponding substantially to the ratio of the respective number of flutes on the hob and the blank, and in effecting relative feeding movement between the hob and the blank to shape and relieve the teeth being cut on the latter.

13. A method of forming hobs, which consists in providing a master hob, in rotating the hob and a blank in opposite directions and in timed relation to each other, the hob being rotated very slightly faster than in accordance with a speed ratio corresponding to the ratio of the respective number of flutes on the hob and the blank, and in providing relative feeding movement between the hob and the blank to shape and relieve the teeth being cut on the latter.

14. A method of forming hobs, which consists in providing a master hob, in rotating the hob and a blank on parallel axes and in timed relation to each other for forming teeth on the blank, the hob and said blank being rotated in opposite directions, and in effecting relative feeding movements between the hob and the blank to shape and relieve the teeth being formed on the latter.

15. A method of forming hobs, which consists in providing a master hob, in rotating the hob and a blank in engagement with each other and in opposite directions, said hob being rotated in timed relation to the blank rotation, in effecting relative angular advancing movement between the hob and the blank, and in effecting relative feeding movement between the hob and the blank to relieve the teeth being formed on the latter.

16. A method of forming hobs, which consists in providing a master hob, in rotating the hob and a blank in timed relation to each other, each tooth on the hob forming a predetermined tooth on the blank and the blank and the hob being rotated in opposite directions, and in relatively moving the hob and the blank to relieve the teeth being cut on the latter.

17. A method of forming hobs, which consists in providing a master hob, in rotating the hob and a blank on parallel axes and in timed relation to each other for forming teeth on the blank, and in effecting relative feeding movement between the hob and the blank while maintaining the two axes in the same plane.

18. A method of forming hobs, which consists in providing a master hob, in rotating the hob and the blank on parallel axes and in timed relation to each other for forming teeth on the blank, and in effecting radial feeding movement between the hob and the blank.

19. A method of forming hobs, which consists in providing a master hob having teeth formed therein by spiral flutes, in rotating the master hob and a blank in timed relation to each other and in opposite directions, said blank having spiral flutes corresponding to the hob flutes but inclined in an opposite direction, and in relatively moving the hob and the blank to relieve the teeth being cut on the latter.

20. A method of forming hobs, which consists in providing a master hob having teeth formed therein by spiral flutes, and in rotating the hob and a blank in timed relation to each other and in opposite directions, said blank having spiral flutes corresponding to the hob flutes but inclined in an opposite direction.

21. A method of forming hobs, which consists in providing a master hob having teeth formed therein by spiral flutes, in rotating the hob and a blank in timed relation to each other, said blank having spiral flutes corresponding to the hob flutes but inclined in an opposite direction, and in effecting relative feeding and relative angular advancing movements between the hob and the blank to relieve the teeth being formed on the blank.

22. A method of forming hobs, which consists in providing a master hob having teeth formed therein by spiral flutes, in rotating the hob and a blank in engagement with each other, said blank having spiral flutes corresponding to the hob flutes but inclined in an opposite direction, and in effecting feeding and angular advancing movements by the hob to relieve the teeth being formed on the blank.

23. A method of forming hobs, which consists in providing a master hob having teeth formed therein by spiral flutes, in rotating the hob and a blank in timed relation to each other, said blank having spiral flutes corresponding to the hob flutes but inclined in an opposite direction, in effecting relative angular advancing movement between the hob and the blank, and in effecting relative feeding movement between the hob and the blank to relieve the teeth being cut on the latter.

24. A method of forming hobs, which consists in providing a master hob having teeth therein formed by spiral flutes, in rotating the hob and a blank on parallel axes and in timed relation to each other, said blank having spiral flutes corresponding to the hob flutes but inclined in an opposite direction, and in effecting relative feeding movement between the hob and the blank to relieve the teeth being cut on the latter.

25. A method of forming hobs, which consists in providing a master hob having undercut teeth formed therein by spiral flutes, in rotating the hob and a blank in timed relation to each other and in opposite directions, said blank having spiral flutes corresponding to the hob flutes but inclined in an opposite direction, and in relatively moving the hob and the blank to relieve the teeth being cut on the latter.

26. A method of forming hobs, which consists in providing a master hob having undercut teeth formed therein by spiral flutes, in rotating the hob and a blank on parallel axes and in timed relation to each other, said hob and blank being rotated in opposite directions, said blank having spiral flutes corresponding to the hob flutes but inclined in an opposite direction, and in relatively feeding the hob and the blank to relieve the teeth being cut on the latter.

27. A method of forming hobs, which consists in providing a master hob having undercut teeth formed therein by spiral flutes, in rotating the hob and a blank in timed relation to each other, said blank having spiral flutes corresponding to the hob flutes but inclined in an opposite direction, and in effecting relative feeding and relative angular advancing movements between the hob and the blank to radially relieve the teeth being formed on the blank.

28. A method of forming hobs, which consists in providing a master hob having undercut teeth formed therein by spiral flutes, in rotating the hob and a blank on parallel axes and in timed relation to each other, said blank having spiral flutes corresponding to the hob flutes but inclined in an opposite direction, and in effecting relative feeding and angular advancing movements between the hob and the blank to relieve the teeth being formed on the blank.

29. A method of forming hobs, which consists in providing a master hob having teeth formed therein by either axial or inclined flutes, in rotating the hob and a blank in timed relation to each other and in opposite directions, said blank having axial flutes if the hob flutes are axial and flutes inclined oppositely to the hob flutes if the hob flutes are inclined, and in relatively moving the hob and the blank to relieve the teeth being cut on the latter.

30. A method of forming hobs, which consists in providing a master hob having teeth formed therein by spiral flutes, in rotating the hob and a blank on parallel axes and in timed relation to each other, said blank being provided with spiral flutes and undercut teeth, and in effecting relative feeding movement between the hob and the blank to relieve the teeth being formed on the latter.

31. A method of forming hobs, which consists in providing a master hob having undercut teeth formed therein by spiral flutes, in rotating the hob and a blank on parallel axes and in timed relation to each other, said hob and the blank being rotated in opposite directions, said blank having spiral flutes corresponding to the hob flutes but inclined in an opposite direction, the blank being engaged along its whole length by the hob, and in effecting relative feeding movement between the hob and the blank to shape and relieve the teeth being cut on the latter.

32. A method of forming hobs, which consists in providing a master hob and a blank of the same number of flutes, the diameter of the hob being greater than the diameter of the blank, in rotating the hob and the blank on parallel axes at substantially the same number of revolutions and in opposite directions, and in effecting relative feeding movement between the hob and the blank to shape and relieve the teeth being formed on the latter.

33. A method of forming hobs, which consists in providing a master hob and a blank having the same number of flutes, in rotating the hob and the blank on parallel axes at substantially the same speeds, the hob and the blank being turned in opposite directions similarly to two intermeshing gear wheels, the hob having a larger diameter than the blank to effect a cutting action, in rotating the hob a trifle faster than the blank to angularly advance the hob with respect to the blank, and in effecting radial feeding movement between the hob and the blank to shape and relieve the teeth cut on the latter.

34. A method of forming hobs, which consists in providing a master hob and a blank, in rotating the hob and the blank on parallel axes at a ratio corresponding substantially to the respective number of flutes on the hob and the blank, said hob and the blank being turned in opposite directions similarly to two intermeshing gear wheels, the hob having a larger diameter than a corresponding gear wheel in order to effect a cutting action, in rotating the hob a trifle faster than in accordance with a speed ratio corresponding to the ratio of the number of flutes on the hob and the blank to angularly advance the hob with respect to the blank, and in effecting radial feeding movement between the hob and the blank in timed relation to the said angular advance of the hob, to shape and relieve the teeth cut on the blank.

35. A method of forming a hob from a blank having a predetermined number of flutes, which consists in providing a master hob having a predetermined number of flutes, the number of flutes on the hob and the blank being so chosen as to contain a common factor different from one, in rotating the master hob and the blank on parallel axes in timed relation to each other, the speed ratio between the hob and the blank corresponding substantially to the ratio of the respective number of flutes on the hob and the blank, each tooth of the master hob cutting only predetermined teeth on the blank, and in effecting relative feeding movement between the hob and the blank to shape and relieve the teeth cut on the latter.

36. A method of forming hobs, which consists in providing a master hob having an even number of flutes, said flutes forming teeth and the teeth formed by each flute being staggered with respect to the teeth formed by the adjacent flutes, in providing a blank with an even number of flutes, in rotating the hob and the blank about parallel axes in timed relation to each other, the speed ratio between the hob and the blank corresponding substantially to the ratio of the respective numbers of flutes on the hob and the blank, and in effecting a relative feeding motion between the hob and the blank to shape and relieve the thread cut on the latter in one continuous operation.

37. A method of forming hobs, which consists in providing a master hob having teeth formed therein by either axial or inclined flutes, in rotating the hob and a blank in timed relation to each other and in opposite directions, said blank having axial flutes if the bob flutes are axial and flutes inclined oppositely to the hob flutes if the hob flutes are inclined, in effecting relative angular advancing movements between the hob and the blank, and in relatively moving the hob and the blank to relieve the teeth being cut on the latter.

38. A method of forming hobs, which consists in providing a master hob having teeth formed therein by either axial or inclined flutes, in rotating the hob and a blank in timed relation to each other and in opposite directions, said blank having axial flutes if the hob flutes are axial and flutes inclined oppositely to the hob flutes if the hob flutes are inclined, in effecting angular advancing movements by the hob with respect to the blank, and in radially feeding the hob with respect to the blank for relieving the teeth being cut on the later.

39. A method of forming hobs, which consists in providing a master hob having teeth thereon in the form of a thread having a predetermined lead, in rotating the hob and a blank in timed relation to each other and in opposite directions, and in effecting relative axial movement between the hob and the blank for forming a thread having a lead corresponding to the lead of the thread on the hob but in an opposite direction.

40. A method of forming hobs, which consists in providing a hob having teeth thereon in the form of a thread having a predetermined lead, in rotating the hob and a blank in engagement with each other and in opposite directions, and in effecting relative axial movement between the hob and the blank for forming a thread having the same lead as the thread on the hob but in an opposite direction, and in effecting relative angular advancing movement by the hob with respect to the blank.

41. A method of forming hobs, which consists in providing a hob having teeth thereon in the form of a thread having a predetermined lead, in rotating the hob and a blank in engagement with each other and in opposite directions, and in effecting relative axial movement between the hob and the blank for forming a thread having the same lead as the thread on the hob but in an opposite direction, and in effecting lateral feeding movements by the hob with respect to the blank for relieving the teeth being cut on the blank.

42. A method of forming hobs, which consists in providing a hob having teeth thereon in the form of a thread having a predetermined lead, in rotating the hob and a blank in engagement with each other and in opposite directions, in forming a thread on the blank with the same lead as the hob thread but in an opposite direction while effecting relative angular advancing movements by the hob with respect to the blank, and in effecting feeding movements by the hob for relieving the teeth being formed on the blank.

43. A method of forming hobs, which consists in providing a hob having teeth thereon in the form of a thread having a predetermined lead, in rotating the hob in engagement with a blank and in opposite directions, the diameter of the hob being larger than the diameter of the blank, in effecting relative axial movement between the hob and the blank for forming a thread having the same lead as the thread on the hob but in an opposite direction, in effecting relative angular advancing movements by the hob with respect to the blank, and in effecting radial feeding movements by the hob with respect to the blank for relieving the teeth being cut on the blank.

44. A method of forming hobs, which consists in providing a hob having teeth thereon in the form of a thread having a predetermined lead, in rotating the hob in engagement with a blank, the hob and the blank being rotated in opposite directions, in effecting relative axial movement between the hob and the blank for forming a thread having the same lead as the thread on the hob but in an opposite direction, in effecting relative angular advancing movements between the hob and the blank, and in effecting lateral feeding movements between the hob and the blank for relieving the teeth being cut on the blank.

45. A method of forming a hob, which consists in providing a hob having teeth thereon in the form of a thread having a predetermined lead, the teeth on said hob being formed by flutes which are inclined with respect to the hob axis, in rotating the hob and a blank in engagement with each other, said blank having flutes therein which are inclined in an opposite direction to the flutes on the hob, and in forming a thread on the blank with the same lead as the hob thread but in an opposite direction while effecting angular advancing movements between the hob and the blank.

46. A method of forming a hob, which consists in providing a hob having teeth thereon in the form of a thread having a predetermined lead, the teeth on said hob being formed by flutes which are inclined with respect to the hob axis, in rotating the hob and a blank in engagement with each other, said blank having flutes therein which are inclined in an opposite direction to the flutes on the hob, in forming a thread on the blank with the same lead as the hob thread but in an opposite direction, and in effecting relative feeding movements between the hob and the blank for relieving the teeth being formed.

47. A method of forming hobs, which consists in providing a hob having teeth thereon in the form of a thread having a predetermined lead, the teeth on said hob being formed by flutes which are inclined with respect to the hob axis, in rotating the hob and a blank in engagement with each other, said blank having flutes therein which are inclined in an opposite direction to the flutes on the hob, and in forming a thread on the blank with the same lead as the hob thread but in an opposite direction while effecting relative feeding and angular advancing movements between the hob and the blank to relieve the teeth being formed.

48. A method of forming a hob, which consists in providing a hob having teeth thereon in the form of a thread having a predetermined lead, the teeth on said hob being formed by spiral flutes, in rotating the hob and a blank in engagement with each other, said blank having flutes therein which are inclined in an opposite direction to the flutes on the hob, in forming a thread on the blank with the same lead as the hob thread but in an opposite direction, and in effecting relative feeding and advancing movements between the hob and the blank to relieve the teeth being formed.

49. A method of forming hobs, which consists in providing a hob having teeth thereon in the form of a thread having a predetermined lead, the teeth on said hob being formed by flutes which are inclined with respect to the hob axis, in rotating the hob and a blank in engagement with each other and in opposite directions, said blank having flutes therein which are inclined in an opposite direction to the flutes on the hob, in forming a thread on the blank with the same lead as the hob thread but in an opposite direction while effecting relative angular advancing movements between the hob and the blank, and in effecting relative feeding movements between the hob and the blank to relieve the teeth being formed.

50. A method of forming hobs, which consists in providing a hob having teeth thereon in the form of a thread having a predetermined lead, the teeth on said hob being formed by flutes which are inclined with respect to the hob axis, in rotating the hob and a blank in engagement with each other and in opposite directions, said blank having flutes therein which are inclined in an opposite direction to the flutes on the hob, in forming a thread on the blank with the same lead as the hob thread but in an opposite direction, while effecting relative angular advancing movements by the hob with respect to the blank, and in effecting feeding movements by the hob for relieving the teeth being formed on the blank.

51. A method of forming hobs, which consists in providing a master hob having teeth formed in a thread by means of flutes, the teeth formed by each flute being staggered with respect to the teeth formed by the adjacent flutes, in rotating the hob in engagement with a blank having corresponding flutes cut in it, and in effecting feeding and angular advancing movements between the hob and the blank for forming relieved teeth on the blank similar to the teeth on the hob.

52. A method of forming hobs, which consists in providing a master hob having teeth formed in a thread by means of flutes, the teeth formed by each flute being staggered with respect to the teeth formed by the adjacent flutes, in rotating the hob in engagement with a blank having corresponding flutes cut in it, said hob and blank being rotated in opposite directions, and in effecting feeding and angular advancing movements between the hob and the blank for forming relieved teeth on the blank similar to the teeth on the hob.

53. A method of forming hobs, which consists in providing a master hob having teeth formed in a thread by means of flutes, the teeth formed by each flute being staggered with respect to the teeth formed by the adjacent flutes, in rotating the hob in engagement with a blank having corresponding flutes cut in it, in effecting angular advancing movements by the hob with respect to the blank, and in effecting feeding movements by the hob for relieving the teeth being formed on the blank.

54. A method of forming hobs, which consists in providing a master hob having teeth formed in a thread by means of flutes, the teeth formed by each flute being staggered with respect to the teeth formed by adjacent flutes, in rotating the hob in engagement with a blank having corresponding flutes cut in it, said hob and the blank being rotated in opposite directions, in effecting angular advancing movements by the hob with respect to the blank, and in effecting feeding movements by the hob for relieving the teeth being formed on the blank.

55. A method of forming hobs, which consists in providing a master hob having rows of teeth formed by flutes, the teeth formed by each flute being staggered with respect to the teeth formed by the adjacent flutes, in rotating the hob in engagement with a blank having corresponding flutes cut in it, and in effecting feeding and angular advancing movements between the hob and the blank for forming relieved teeth on the blank similar to the teeth on the hob.

56. A method of forming hobs, which consists in providing a master hob having rows of teeth formed by flutes, the teeth formed by each flute being staggered with respect to the teeth formed by the adjacent flutes, in rotating the hob in engagement with a blank having corresponding flutes cut in it, said hob and the blank being rotated in opposite directions, in effecting angular advancing movements by the hob with respect to the blank, and in effecting feeding movements by the hob for relieving the teeth being formed on the blank.

57. A method of forming hobs, which consists in providing a master hob having teeth formed in a thread by means of flutes, the teeth formed by each flute being staggered with respect to the teeth formed by the adjacent flutes, in rotating the hob in engagement with a blank having corresponding flutes cut in it, said hob and blank being rotated in opposite directions and having different diameters, and in effecting feeding and angular advancing movements between the hob and the blank for forming relieved teeth on the blank similar to the teeth on the hob.

58. A method of forming hobs, which consists in providing a master hob having teeth provided with non-radially arranged cutting faces formed by flutes, in rotating the master hob and a blank in engagement with each other and in opposite directions, said blank having flutes cut in it similar to the flutes in the master hob, in effecting angular advancing movements between the hob and the blank, and in effecting relative feeding movements between the hob and the blank to relieve the teeth being formed on the latter.

59. A method of forming hobs, which consists in providing a master hob having teeth provided with non-radially arranged cutting faces formed by flutes, in rotating the master hob and a blank in engagement with each other and in opposite directions, said blank having flutes cut in it similar to the flutes in the master hob, in effecting angular advancing movements between the hob and the blank, and in effecting relative feeding movements between the hob and the blank to radially relieve the teeth being formed on the latter.

60. A method of forming hobs, which consists in providing a master hob having teeth provided with non-radially arranged cutting faces formed by flutes, in rotating the master hob and a blank in engagement with each other, said blank having flutes cut in it similar to the flutes in the master hob, in effecting angular advancing movements by the master hob with respect to the blank, and in effecting feeding movements by the master hob to radially relieve the teeth being formed on the blank.

61. A method of forming hobs, which consists in providing a hob having undercut teeth thereon in the form of a thread having a predetermined lead, the teeth on said hob being formed by flutes which are inclined with respect to the hob axis, in rotating the hob and a blank in engagement with each other, said blank having flutes therein which are inclined in an opposite direction to the flutes on the hob, and in forming a thread on the blank with the same lead as the hob thread but in an opposite direction.

62. A method of forming hobs, which consists in providing a hob having undercut teeth thereon in the form of a thread having a predetermined lead, the teeth on said hob being formed by flutes which are inclined with respect to the hob axis, in rotating the hob and a blank in engagement with each other and in opposite directions, said blank having flutes therein which are inclined in an opposite direction to the flutes on the hob, in forming a thread on the blank with the same lead as the hob thread but in an opposite direction, and in effecting feeding and angular advancing movements between the hob and the blank for relieving the teeth being formed on the latter.

63. A method of forming hobs, which consists in providing a master hob having undercut teeth formed therein by flutes, in rotating the master hob and a blank in engagement with each other and in opposite directions, said blank having flutes formed therein similar to the flutes in the hob, and in relatively moving the hob and the blank to relieve the teeth being cut on the latter.

64. A method of forming hobs, which consists in providing a master hob having undercut teeth formed therein by flutes, in rotating the hob in engagement with a blank having flutes similar to the hob flutes cut therein, the diameter of the blank being different from the diameter of said hob, the hob and the blank being rotated in opposite directions, and in effecting feeding and angular advancing movements by the hob in timed relation to the rotation of the blank.

65. A method of forming hobs, which consists in providing a master hob having undercut teeth formed therein by either axial or inclined flutes, in rotating the master hob and a blank in engagement with each other and in opposite directions, said blank having similar axial flutes if the hob flutes are axial and similar flutes inclined oppositely to the hob flutes if the hob flutes are inclined, in effecting relative angular advancing movements between the hob and the blank, and in relatively moving the hob and the blank to relieve the teeth being cut on the latter.

66. A method of forming hobs, which consists in providing a master hob having teeth arranged in the form of a thread having a predetermined lead, in rotating the hob and a blank on parallel axes and in timed relation to each other, said hob and blank being rotated in opposite directions and the speed ratio of the hob and the blank corresponding substantially to the ratio of the number of threads on the hob and the number of threads to be formed on the blank, and in effecting relative feeding movement between the hob and the blank for forming a thread having a lead, said thread having a lead equal to the lead of the master hob multiplied by the ratio of the respective number of threads on the blank and the hob and in an opposite direction as compared with the lead of the hob thread.

67. A method of forming hobs, which consists in providing a master hob having teeth thereon in the form of a single thread having a predetermined lead, in rotating the hob and a blank on parallel axes and in timed relation to each other, said hob and blank being rotated in opposite directions and the speed ratio of the hob and the blank corresponding substantially to the number of threads to be cut on the blank, and in effecting relative feeding movement between the hob and the blank for forming a thread having a lead, said thread having a lead equal to the lead of the hob multiplied by the numbers of threads being formed on the blank and in an opposite direction as compared with the lead of the hob thread.

68. A method of forming hobs, which consists in providing a master hob having teeth thereon in the form of a thread having a predetermined lead, in rotating the hob and a blank on parallel axes and in timed relation to each other, said hob and the blank being rotated in opposite directions and the speed ratio of the hob and the blank corresponding substantially to the ratio of the respective number of threads on the hob and the threads to be formed on the blank, the hob running a trifle faster than would correspond to the exact ratio of the respective number of threads on the hob and the blank to effect an angular advance thereof, and in effecting relative feeding movement between the hob and the blank for forming a thread having a lead, said thread having a lead equal to the lead of the master hob multiplied by the ratio of the respective number of threads on the blank and the hob and in an opposite direction as compared with the lead of the hob thread.

69. A method of forming hobs, which consists in providing a master hob having teeth thereon in the form of a thread having a predetermined lead, in rotating the hob and a blank on parallel axes and in timed relation to each other, said hob and the blank being rotated in opposite directions and the speed ratio of the hob and the blank corresponding substantially to the ratio of the respective number of threads on the hob and the threads to be formed on the blank, and in effecting relative axial movement between the hob and the blank for forming a thread having a lead, said thread having a lead equal to the lead of the hob multiplied by the ratio of the respective number of threads on the blank and the hob and in an opposite direction as compared with the lead of the hob thread.

70. A method of forming hobs, which consists in providing a master hob having teeth in the form of a thread having a predetermined lead, in rotating the hob and a blank on parallel axes and in timed relation to each other, said hob and the blank being rotated in opposite directions and at substantially the same rotative speed, the master hob running a trifle faster than the blank to effect an angular advance with every revolution, the diameter of the master hob being larger than the diameter of the blank, and in effecting relative axial feeding movement between the hob and the blank for forming a hob of the same lead and the same number of threads as the master hob, the thread being however of opposite direction compared with the lead of the master hob.

71. A method of forming hobs, which consists in providing a master hob having teeth in the form of a thread having a predetermined lead, in rotating the hob and a blank in engagement with each other and in timed relation to each other, said hob and the blank being rotated at a ratio corresponding substantially to the ratio of the number of helicoidal threads to be cut on the blank and the number of helicoidal threads of the hob, said hob running a trifle faster than in accordance with said ratio in order to effect an angular advance, and in effecting relative feeding movement between the hob and the blank.

72. A method of forming hobs, which consists in providing a master hob having teeth in the form of a thread having a predetermined lead, in rotating the hob and a blank in timed relation to each other and in opposite directions, in effecting relative axial movement between the hob and the blank for forming a thread having a lead corresponding to the lead of the master hob and to the ratio of the hob and the blank rotations, the lead of the blank thread extending in an opposite direction as compared with the lead of the thread on the hob, and in effecting radial feeding movement between the hob and the blank for relieving the teeth being cut on the blank.

73. A method of forming hobs, which consists in providing a master hob having teeth in the form of a thread having a predetermined lead, in rotating the hob and a blank on parallel axes and in timed relation to each other, said hob and the blank being rotated in opposite directions, in effecting relative axial movement between the hob and the blank for forming a thread having a predetermined lead, the lead of the thread on the blank extending in an opposite direction as compared with the thread on the hob, and in effecting a radial feeding movement between the hob and the blank for relieving the teeth being cut on the latter.

74. A method of forming a hob from a blank, which consists in providing a master hob having teeth in the form of a thread having a predetermined lead, the number of flutes on said hob being so chosen, that the ratio of the number of flutes on the hob and on the blank is equal to the ratio of the number of threads on the hob and the blank, in rotating the hob and the blank about parallel axes and in timed relation to each other, said hob and the blank being rotated in opposite directions, and in effecting relative feeding movement between the hob and the blank to shape and relieve the teeth being cut on the latter.

In testimony whereof, I hereto affix my signature.

ERNEST WILDHABER.